US011075866B2

(12) United States Patent
Bell (10) Patent No.: US 11,075,866 B2
(45) Date of Patent: *Jul. 27, 2021

(54) INTEROPERABLE CLINICAL DOCUMENT-EXCHANGE SYSTEM (71) Applicant: KNO2 LLC, Boise, ID (US)

(72) Inventor: Therasa Bell, Boise, ID (US)

(73) Assignee: KNO2 LLC, Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,643

(22) Filed: Jan. 13, 2020

(65) Prior Publication Data

US 2020/0153770 A1 May 14, 2020

Related U.S. Application Data (63) Continuation of application No. 15/639,684, filed on Jun. 30, 2017, now Pat. No. 10,574,606, which is a continuation of application No. 14/614,368, filed on Feb. 4, 2015, now Pat. No. 9,729,480.

(51) Int. Cl.
G06F 15/16 (2006.01)
H04L 12/58 (2006.01)

(52) U.S. Cl.
CPC ............ *H04L 51/066* (2013.01); *H04L 51/22* (2013.01)

(58) Field of Classification Search
CPC ... H04L 51/066; H04L 9/0822; H04L 9/0825; H04L 29/06673
USPC ........................................ 709/206, 203, 218
See application file for complete search history.

(56) References Cited

U.S. PATENT DOCUMENTS

| 7,376,706 | B2 | 5/2008 | Goguen | |
|---|---|---|---|---|
| 7,827,398 | B2 | 11/2010 | Liu et al. | |
| 8,117,438 | B1 | 2/2012 | Albisu et al. | |
| 8,762,712 | B1 | 6/2014 | Kwan et al. | |
| 8,938,507 | B2 | 1/2015 | Bostick et al. | |
| 9,479,928 | B2 | 10/2016 | Vats et al. | |
| 2002/0023143 | A1* | 2/2002 | Stephenson | H04L 63/061 709/218 |
| 2004/0204079 | A1* | 10/2004 | Hamdi | H04W 88/06 455/557 |
| 2005/0209996 | A1* | 9/2005 | Stewart | G06F 16/954 |
| 2006/0031352 | A1* | 2/2006 | Marston | H04L 51/00 709/206 |
| 2008/0028030 | A1 | 1/2008 | Wellons et al. | |
| 2009/0235065 | A1 | 9/2009 | Nilsson et al. | |
| 2010/0281257 | A1* | 11/2010 | Yamazaki | H04L 63/123 713/168 |
| 2011/0249572 | A1* | 10/2011 | Singhal | H04L 43/08 370/252 |

(Continued)

OTHER PUBLICATIONS

PCT International Written Opinion and Search Report dated Apr. 8, 2016.

*Primary Examiner* — Kaylee J Huang
(74) *Attorney, Agent, or Firm* — Finnegan, Henderson, Farabow, Garrett & Dunner, LLP (57) ABSTRACT A method of exchanging messages between users over a network includes receiving a registration request from an organization and provisioning an organizational sub-domain, verifying the registration request according to requirements of a first protocol and provisioning a first user address that is part of the organizational sub-domain, and sending a message from the first user address to a second user address according to the first protocol.

22 Claims, 6 Drawing Sheets (56) References Cited

U.S. PATENT DOCUMENTS

| | | |
|---|---|---|
| 2012/0239413 A1 | 9/2012 | Mathur et al. |
| 2014/0189160 A1 | 7/2014 | Haddad et al. |
| 2014/0250162 A1* | 9/2014 | Bell ........................ G06F 19/00 709/201 |
| 2014/0297321 A1 | 10/2014 | Adams |
| 2015/0327030 A1 | 11/2015 | Bendi et al. |
| 2016/0198319 A1* | 7/2016 | Huang .................. G06F 3/0488 455/412.2 |

* cited by examiner

INTEROPERABLE CLINICAL DOCUMENT-EXCHANGE SYSTEM

This is a continuation of application Ser. No. 15/639,684, filed Jun. 30, 2017 (allowed), which is a continuation of application Ser. No. 14/614,368, filed Feb. 4, 2015 (now U.S. Pat. No. 9,729,480), which are incorporated herein by reference.

FIELD OF THE INVENTION

This invention relates generally to the field of digital security and electronic communications, and more particularly to computerized systems and methods for interoperable clinical document-exchange.

BACKGROUND

Multiple files, records, and documents are created for individual patients every day. This widely varying collection of documents and data comes from many different care organizations, each of which may use different systems for storing, managing, and sending information. To ensure quality care for patients who may require services from more than one organization, each organization may need access to the documents and data produced and stored by another organization.

Organizations have frequently relied on decades-old unsecure fax technology or ordinary paper mail to exchange these documents and data. With the advent of the Internet, many care organizations exchange clinical documents online, using equally unsecure technologies, such as email. This practice threatens the confidentiality of patient information and serves as an inefficient means for exchanging clinical documents and data.

As patient and legislative awareness of the importance of patient privacy has increased, however, so has the need for a way to exchange clinical documents securely, conveniently, and in an interoperable manner. Governments and standard-setting-organizations have begun to adopt protocols for exchanging clinical documents, but there is no universal standard. A single, global standard for document-exchange may never emerge given the varying requirements for patient privacy among jurisdictions, organizations, and countries. As a result, the exchange of clinical documents remains inconvenient, fragmented, and unsecure.

SUMMARY OF THE INVENTION

Computer implemented systems, methods, and computer-readable media consistent with the invention for exchanging data between users over a network may exchange messages, documents, and other data.

A cloud-based computer-implemented method, consistent with the invention for exchanging data between users over a network, comprises receiving a registration request from an organization and provisioning an organizational sub-domain, verifying the registration request according to requirements of a first protocol, and provisioning a first user address to a first user, wherein the first user address is part of the organizational sub-domain and sending a message from the first user address to a second user address according to the first protocol.

A computer-implemented system for exchanging data between users over a network consistent with this invention comprises a storage device that stores instructions and a processor configured with the instructions (i) to receive a registration request from an organization and provision an organizational sub-domain, (ii) to verify the registration request according to requirements of a first protocol, and provision a first user address to a first user, wherein the first user address is part of the organizational sub-domain, and (iii) to send a message from the first user address to a second user address according to the first protocol.

BRIEF DESCRIPTION OF DRAWINGS

The accompanying drawings, which are incorporated in and constitute a part of this disclosure, illustrate several embodiments and aspects of this disclosure, and together with the description, serve to explain certain principles of the invention.

DETAILED DESCRIPTION

The embodiments of FIGS. 1-6 are provided for purposes of illustration, and not limitation.

Embodiments of this disclosure encompass systems, methods, and computer-readable media, for exchanging data between users over a network. By way of example, data may be exchanged in a clinical context between organizations that provide medical care for patients. Data may include messages, notes, images, clinical documents, and any other data relevant to patient care.

Data exchange may occur according to one or more protocols to ensure protection of patient privacy. As used in this disclosure, "protocol" refers to a standard or set of standards, such as the standards promulgated by the Direct Project. A protocol may include requirements for identity verification, such as compliance with one of the ID proofing levels promulgated by the National Institute of Standards and Technology (NIST). A protocol may further include a standard or set of standards for secure communication. For example, a protocol may require asymmetric cryptography and/or registration with a central database authority, or a certain level of security from point to point, e.g., from message sender to message receiver. Interoperable data exchange may be achieved allowing data to be exchanged among organizations and users employing differing protocols.

Embodiments of this invention encompass systems, methods, and computer-readable media, for exchanging clinical information between users of organizations over a network. Clinical data may be exchanged between users of different organizations providing medical care to one or more patients, in a one-way or bi-directional manner, and according to one or more protocols. The protocol may require user- or organization-level verification according to one or more protocols to ensure patient privacy or to comply with legislative mandates.

Figure 1:
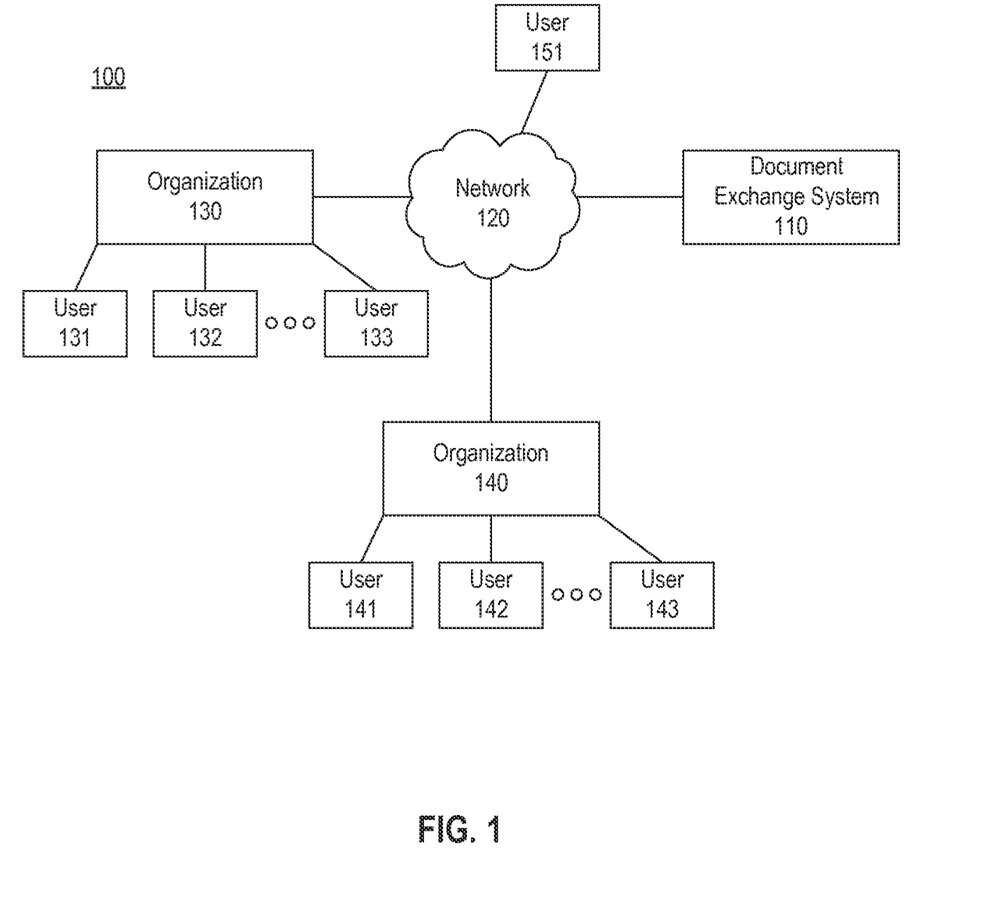
FIG. 1 illustrates an exemplary system environment for implementing the embodiments in this disclosure.

FIG. 1 illustrates an exemplary system environment 100, while the exemplary embodiment of FIG. 1 and the other embodiments described refer to clinical document-exchange, embodiments consistent with the invention may handle other forms of electronic communications, such as insurance documents or legal communications. The arrangement and number of components in FIG. 1 is only exemplary, and different numbers and arrangements and components are also possible.

System environment 100 may include document-exchange system 110, network 120, a plurality of organizations 130 and 140, and a plurality of users 131, 132, 133, 141, 142, 143, and 151. Document-exchange system 110 may include components of the system described further below in reference to FIG. 2. Organizations 130 and 140 may be organizations that interact with document-exchange system 110, such as hospitals, clinics, or other care organizations, that seek to exchange data with each other. Each organization may have users that are part of the organization. For example, users 131, 132, and 133 are part of organization 130. Users may be employees (e.g., doctors or receptionists) in their respective organization. The organizations may interact with document-exchange system 110 through their users.

Document-exchange system 110 may receive registration requests from organizations or users. A registration request may include any combination of data, a message, or a signal that indicates the organization or user is seeking to register with document-exchange system 110. For example, document-exchange system 110 may receive a predefined message in the form of a data packet that indicates an organization is requesting registration.

Document-exchange system 110 may receive registration requests through network 120. Network 120 may comprise one or more networks suitable for electronic communication, such as the Internet, an intranet, or a local LAN. Network 120 can also include virtual networks. For example, organizations and users may connect to network 120 and send virtual requests to document-exchange system 110 that never leave a mainframe or are routed via a virtual private network to document-exchange system 110.

As a result of receiving a registration request from an organization, document-exchange system 110 may provision a sub-domain for the organization. A "sub-domain," as used in this disclosure, may be a virtual representation that corresponds to an organization or group. A sub-domain may comprise a domain that is part of a larger domain. The domains and sub-domains may have a tree structure or hierarchy, with each sub-domain, other than the root domain, having a parent domain and each parent domain having a child sub-domain. The only domain that is not also a subdomain may be called the root domain. For example, document-exchange system 110 may provision a sub-domain based on the Domain Name System (DNS) naming system for computers, services, and resources that are connected to the Internet or a private network. A document-exchange system 110 may include a root domain, e.g., docexchange.org, and provision a sub-domain as a result of receiving a registration request, e.g., subdomain.docexchange.org.

To further illustrate, as a result of receiving a registration request from organization 130, document-exchange system 110 may provision a sub-domain corresponding to organization 130 (e.g., organization130@docexchange.org). The sub-domain corresponding to organization 130 may be part of a larger domain corresponding to the document-exchange system. The subdomain corresponding to the organization 130 may be part of a larger domain corresponding to the type of organization. For instance, organization 130 may be a hospital. As a result of receiving a registration request, document-exchange system 110 may provision a sub-domain to organization 130 that is part of a larger domain corresponding to hospitals (e.g., organization130.hospitals.docexchange.org). The larger domain may itself be a sub-domain that is part of a larger domain. In the previous example, the larger domain corresponding to hospitals was part of a still larger domain corresponding to document-exchange system 110.

Other implementations of tree structures and domains are contemplated by this disclosure, and reference to the DNS naming system is by way of example only. For instance, document-exchange system 110 may provision sub-domains in the form of folders in a hierarchical folder structure, e.g., docexchange.org/organization130. Document-exchange system 110 may also provision a sub-domain that does not manifest itself to the organizations or users in any way. For example, document-exchange system 110 may provide access to an organization and its users to their sub-domain through a dedicated page that does not reflect its relationship with its parent sub-domain or any other sub-domain or domain.

Document-exchange system 110 may verify the registration request according to the requirements of a protocol. A protocol may include a standard or set of standards for verification of a registration request. Embodiments for verifying the registration request are described further below in reference to FIG. 2.

Document-exchange system 110 may provision user addresses to users. Document-exchange system 110 may provision user addresses to users in a requesting organization. For example, document-exchange system 110 may provision a user address to users 131, 132, and 133 after provisioning a sub-domain corresponding to organization 130 and verifying the organization's registration request. User addresses may be part of the organization's sub-domain. For example, document-exchange system 110 may provision a user address to user 131 that is part of the sub-domain of organization 130 (e.g., user131@organization130.documentexchangesystem.org).

Document-exchange system 110 may provision user addresses that are not part of an organization's sub domain. For example, document-exchange system 110 may provision a user address to user 151, who is not part of or employed by an organization. Document-exchange system 110 may provision such user addresses as standalone user addresses. For example, document-exchange system 110 may provision such user addresses as standalone user addresses and provide access through a separate page that is not associated with an organization. Document-exchange system 110 may also provision user addresses that are part of a sub-domain that is not associated with an organization. For example, document-exchange system 110 may provision a user address that is part of a sub-domain associated with solo practitioners to user 151, who may be a solo practitioner. In another example, document-exchange system 110 may provision a user address that is part of a sub-domain associated with patients to user 151, who may be a patient.

Document-exchange system 110 may also receive messages from the organizations or users through network 120. Such messages may include documents, messages, or other data that one organization or user desires to transmit to another organization or user. For example, document-exchange system 110 may receive a message from organization 130 in the form of a patient chart. The message may also include a recipient address indicating the desired destination for the message. For instance, document-exchange system 110 may receive a message from organization 130 that includes a recipient address for user 141 in organization 140. As a result, document-exchange system 110 may send the message from organization 130 to user 141.

Document-exchange system 110 may send and receive messages through network 120 according to a protocol. Document-exchange system 110 may also send and receive messages according to a secure protocol. For example, document-exchange system 110 may send messages in the form of encrypted data streams as required by the protocol. Document-exchange system 110 may send the message in the form of an encrypted email. Document-exchange system 110 sends and receives messages according to the Direct-Trust framework standards. For example, document exchange system 110 may employ asymmetric cryptography, also known as public-key cryptography, to encrypt messages using the recipient's public key. As a result, the recipient may decrypt the message using the recipient's private key. Document-exchange system 110 may also send and receive messages according to other protocols. For example, document-exchange system 110 may send and receive messages according to the National Health Information Network Exchange protocol. The protocols provided here are by way of example only and not limiting.

Document-exchange system 110 may send and receive messages by simultaneously using these protocols and other protocols to achieve interoperable exchange of clinical documents and data. For example, document exchange system 110 may use different protocols for sending and receiving messages. Document-exchange system 110 may send and receive multiple messages through network 120 according to more than one protocol. To illustrate, document-exchange system 110 may send a message from user 131 to user 141 according to a protocol that requires end-to-end secured communications. For example, document-exchange system 110 may receive a message, intended for user 141, from user 131 that is secured through Transport Layer Security (TLS) or its predecessor, Secure Sockets Layer (SSL). This may occur, for instance, when user 131 accesses the sub-domain of organization 130 through a web portal provided by document-exchange system 110. Document-exchange system 110 may then send that message to user 141 using a secure form of communication, e.g., asymmetric cryptography. For example, document-exchange system 110 may send the message by encrypting it with user 141's public key and send the result to user 141. User 141 may then access the message by decrypting the received data using the associated private key. Document-exchange system 110 may then send a message from user 132 to user 141 according to another protocol that also requires end-to-end encryption, but requires the use of symmetric key cryptography. Document-exchange system 110 may then receive a second message intended for user 141, from user 132 that is secured through SSL/TLS. Document-exchange system 110 may then send the second message to 141 according to the second protocol, using symmetric key cryptography.

In another example, document-exchange system 110 may send the same message from a single user to multiple users according to one or more protocols. To illustrate, document-exchange system may send a message from user 131 to user 141 to a first protocol and another message from user 131 to user 142 according to a second protocol. Document-exchange system 110 may use a wide variety of protocols to achieve interoperable document exchange.

Document-exchange system 110 may send messages directly or indirectly to users. Document-exchange system 110 may send messages directly to users. For example, document-exchange system 110 may send a message directly to user 141's device encrypted using user 141's public key. User 141 may then access the encrypted message by using the associated private key. Document-exchange system 110 may also send messages indirectly to users. For example, document-exchange system 110 may determine that organization 140, of which user 141 is a part, is associated with another document-exchange system. Document-exchange system 110 may further determine that the second document-exchange system is the appropriate intermediate recipient of messages to user 141. For example, document-exchange system 110 may determine that the second document-exchange system handles user 141's private keys on behalf of user 141. Accordingly, document-exchange system 110 may send the message to user 141 indirectly by sending it to the second document-exchange server. User 141 may then access the message by receiving it from the second document-exchange system. For example, user 141 may access a web portal of the second document-exchange system and access the message. The verbs "send" and "receive" encompass both direct and indirect transmission of messages.

Figure 2:
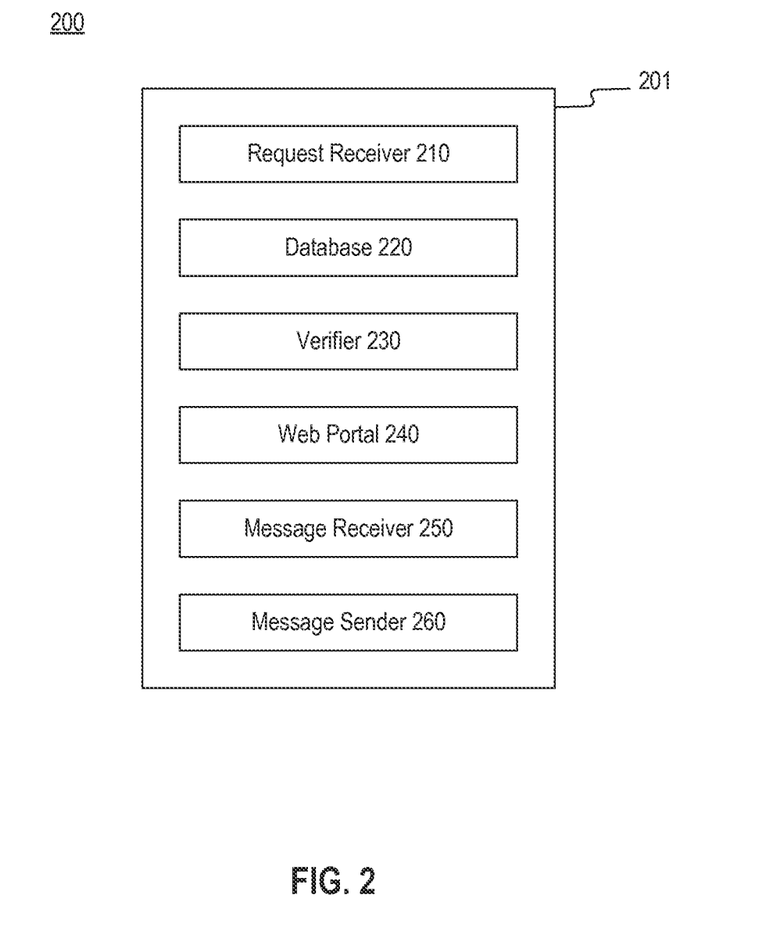
FIG. 2 illustrates an exemplary system for implementing embodiments of this invention.

FIG. 2 illustrates exemplary system 200 for implementing embodiments consistent with this invention, System 200 includes document-exchange system 201, and document-exchange system 201 includes request receiver 210, database 220, verifier 230, web portal 240, message receiver 250, and message sender 260. These components of system 200 may be implemented using any suitable combination of hardware, software, and/or firmware. The components may correspond to functional blocks implemented with a set of instructions executed by suitable hardware (e.g., a computer, a server, a group of computers, or one or more computing nodes operating over a network). The components may also correspond to programmable, fixed-function hardware, such as programmable-logic devices, such as PALs, PLAs, CPLDs, or FPGAs. The number and arrangement of components in FIG. 2 is merely provided for illustration.

Request receiver 210 may receive registration requests, which may originate from organizations. For example, organization 130 may send a request indicating a desire to join and other messages through document-exchange system 201. Organization 130 may be a hospital, clinic, or other care organization wishing to exchange clinical data. Registration requests may also originate from users. For example, user 131 may send a request indicating a desire to join and send messages through document-exchange system 110. Registration requests originating from users may indicate their association with one or more organizations. For example, user 131 may indicate in or with the request an association with organization 130. User 131 may be, a physician or nurse in the hospital or other care organization. Registration requests originating from users may also indicate no organizational association. For instance, user 151 may send a registration request. User 151 may be a solo practitioner or a patient that lacks organizational affiliation. Users that are part of an organization may decline to indicate an organizational association. For example, user 132 may send a registration request and decline to indicate an organizational association.

Request receiver 210 may access database 220. Request receiver 210 may access database 220 to determine whether the requesting user or organization already has access to document-exchange system 201. For example, request receiver 210 may compare information with the registration request with information in database 220 to determine whether the registering organization or user has already been provisioned a subdomain or address respectively. Request receiver 210 may then deny the request and send a signal to the requesting organization or user to indicate the previous registration. Request receiver 210 may access database 220 and determine the requesting organization or user does not have access to document-exchange system 201. Request receiver 210 may then send the registration request along with any supplied data to verifier 230.

Database 220 may store data used by document-exchange system 201. Database 220 may store user and organizational information, such as to indicate an organization has previously registered with document-exchange system 201 or has previously been provisioned a sub-domain. Database 220 may also store information to indicate a user has previously registered with the document-exchange system or has previously been provisioned a user address. Database 220 may also store data describing the relationship between users and organizations. For example, database 220 may store information indicating a user is a member of an organization. Database 220 may also store information indicating whether the user was formerly a member and the period of time during which the user was a member. Embodiments for storing the relationship between users and organizations are described further below in reference to FIG. 3.

Database 220 may store other information associated with the operation of document-exchange system 201. For example, database 220 may store data associated the organizational sub-domains or message templates from document-exchange system 201, as described further below in reference to FIG. 5. In still another example, database 220 may store information relating to the document-exchange capabilities of organizations and users in geographic areas. For example, database 220 may store information describing the location of each user and organization, and allow users to choose a protocol for sending a message as described further below in reference to FIG. 5.

Database 220 may also store keys, such as public and private keys associated with document-exchange system 201. For example, database 220 may store public and private keys associated with document-exchange system 201 so messages from document-exchange system 201 may be signed with a digital certificate and messages received may be decrypted. Database 220 may store keys associated with other document-exchange systems or trust authorities. For example, database 220 may store the public key of a trust authority or other document-exchange system to allow document-exchange system 201 to send and receive messages securely to users through intermediaries.

Database 220 could store keys associated with users and organizations, such as public and private keys associated with users. A user may send a message to document-exchange system 201 through web portal 240, as described further below, that is secured through SSL/TLS. Document-exchange system 201 may then send the message to the recipient by encrypting the message with the user's private key.

Database 220 may store any information related to the operation of document-exchange system 201 and the foregoing examples are provided by way of example and are by no means exhaustive.

Verifier 230 may verify registration requests from both users and organizations. Verifier 230 may verify the registration request according to requirements of a protocol, such as the NIST Level 3 of Assurance for identity proofing as specified in NIST SP 800-63-1. Verifier 230 may verify the registration request from the organization by verifying the identity of the requesting representative of the organization and the organization's name and address. Verifier 230 may also verify the identity of the requesting representative by confirming information in the form of a government-issued ID number and financial-account number with the applicable agency or a credit bureau database. Verifier 230 may also verify the organization's name, address, and existence through a database. For example, Verifier 230 may verify an organization's name and address through a public database, such as EDGAR, or through a credit bureau.

Verifier 230 may also verify the registration request according to other requirements. For example, verifier 230 may verify a registration request from an organization by complying with internal protocols set by the provider of document-exchange system 201 as company policy, pursuant contractual obligations, or for other reasons. For example, verifier 230 may forgo verifying a registration request from a user after determining the organization included the user on an authorized user list and signed a waiver waiving verification or a certification certifying the users on the authorized user list have been independently verified.

Verifier 230 may examine data in database 220, for example to verify the registration request received by request receiver 210. For example, verifier 230 may examine data stored in database 220 to determine whether the organization has previously attempted registration. Verifier 230 may vary or increase the requirements for successful verification based on the number of previous, unsuccessful registration attempts or other factors. For example, verifier 230 may vary the requirements for successful verification based on the requirements of a protocol that calls for "trust" verification with a central database.

Verifier 230 may also examine organizational data in database 220. For example, database 220 may store organizational information as an authorized employee list, as further described below in reference to web portal 240. Verifier 230 may vary, decrease, or eliminate altogether, the requirements for successful verification of a user based on the presence of that user in an authorized list. In another example, database 220 may store organization information indicating that the organization has signed a release or certification that affirms the identity of individuals in a list. Verifier 230 may then vary, decrease, or eliminate altogether, the requirements for successful verification of a particular user based on the presence of that user in the list.

Verifier 230 may also store data in database 220, such as the verification results of each registration request. For example, verifier 230 may store information in database 220 indicating that a verification request has been received and the results of the verification by verifier 230. Verifier 230 may also communicate verification results with web portal 240. For example, verifier 230 may communicate successful verification of a registration request to web portal 240 by setting a flag in database 220 or through another method.

Web portal 240 may provision organizational sub-domains to organizations. Web portal 240 may only provision an organizational sub-domain after verifier 230 has successfully verified a registration request from an organization.

Web portal 240 may store an organizational sub-domain in database 220. Web portal 240 could create a virtual representation of an organization in the form of a sub-domain that is part of a larger domain and store the representation in database 220. For example, web portal 240 may create a directory structure corresponding to the organizational sub-domain in database 220.

Web portal 240 may allow access to the organizational sub-domain through an interface, such as a web page located at a particular uniform resource indicator (URI) or at a uniform resource locator (URL) that complies with the DNS naming system called "organization130.hospitals.docexchange.org." Web portal 240 may also allow access to an organizational sub-domain through another interface, such as a dedicated software platform. For example, web portal 240 may interact with a dedicated software platform used by the organization and provide access to the sub-domain through that platform.

Web portal 240 may allow an organization's representative to interact with its sub-domain. Web portal 240 could provide the organization with a login to access the organization's sub-domain. For example, web portal 240 may provide a login that allows a representative of the organization to add and remove authorized users to the organization's sub-domain. Web portal 240 may also allow an organization's representative to interact with its sub-domain through other means. For example, web portal 240 may detect the computer from which a representative attempts to access the sub-domain through its IP address and save information about the computer to database 220. Web portal 240 may use or combine other security measures, such as requiring a signed digital certificate before allowing an organization's representative to interact with the sub-domain.

Web portal 240 may allow an organization's representative to enter information about the organization and its users. Web portal 240 may also allow an organization to enter information sufficient to describe an organizational structure. Such information may include (i) information relating to the hierarchical structure of the organization, such as its subdivision into departments, (ii) information relating to the physical location of individuals in the organization, such as geographic location, or physical location in a building or floor, or (ii) relational information in a conceptual subgroup. Embodiments of organizational information that may be stored in database 220 are described further below in reference to FIG. 3.

Web portal 240 may allow an organization to add or remove users, for example, by allowing an organization's representative to specify a list of authorized users. For example, an organization's representative may specify a list of employees of the organization that require access to document-exchange system 201. As a result, web portal 240 may store the authorized employee list as organizational information in database 220. Web portal 240 may also prohibit an organization from adding or removing users, or may only allow an organization to remove users, such as, when an employee leaves an organization. In this example, web portal 240 may require that a user initiate a registration request and complete verification by verifier 230 to add a user. Web portal 240 may also prohibit an organization from removing users and instead require users to request their removal.

Web portal 240 may allow users to initiate registration requests. Web portal 240 could allow organizational employees to initiate registration requests. For example, web portal 240 may provide an interface to allow a user to request access to a particular organizational sub-domain by specifying the organization for which the user works. Web portal 240 may invite users to initiate registration requests. For example, web portal 240 may invite the users in an authorized employee list to submit registration requests. Web portal 240 may also allow users without organizational affiliations to initiate registration requests. For example, web portal 240 may allow a solo practitioner or a patient to submit a registration request.

Web portal 240 may send registration requests from users to verifier 230. Web portal 240 may send the registration request to verifier 230 and add the user to the organizational sub-domain after verifier 230 verifies the registration request. For example, web portal 240 may send a registration request from a doctor at the organization to verifier 230. After verifier 230 verifies the registration request, web portal 240 may provision a user address to the doctor.

Web portal 240 may also provision user addresses to members or employees of an organization. For example, web portal 240 may provision a user address to a doctor at an organization as a result of a successful registration request or may provision user addresses to those without any affiliation to an organization, such as a patient or solo practitioner that is not part of an organization. Web portal 240 may also provision a user address automatically without a registration request from the user. For example, an organization, through its representative, may enter a list of authorized users into web portal 240 and indicate it has signed a release or the users have been independently verified by the organization. As a result, web portal 240 may provision a user address to each of the users in the authorized list.

Web portal 240 may also provision user addresses that are part of an organizational sub-domain. Web portal 240 may also provision user addresses according to a protocol, such as the Direct standards promulgated by the Direct Project organization. The provider of document-exchange system 201 may partner with a health information service provider (HISP) to provide user addresses in the form of Direct addresses. As a result, web portal 220 may provision a user address that is part of an organization sub-domain in the form of a Direct address, such as user@organization.documentexchange.org. The provider of document-exchange system 201 may itself be a HISP and provide Direct addresses, such as user@organization.HISP.org.

Web portal 240 may also provision user addresses according to another protocol. For example, web portal 240 may provision user addresses according to a protocol mandated by law. Provisioning user addresses may comply with many protocols, including those not mentioned in the specification.

Web portal 240 may also provision addresses to comply with multiple protocols. For example, web portal 240 may provision a single user address, e.g., user@organization.documentexchange.org, that complies with both the DirectTrust and Western States Consortium Pilot implementations of the Direct standard, or provision a single user address that complies with the Direct standard and another protocol altogether.

Web portal 240 may also provision one or more back-end addresses associated with a user address to comply with conflicting protocols. For example, two protocols may require features that inherently conflict with each other. Web portal 240 may, in such a case, provision one or more back-end address for each of these conflicting protocols. Web portal 240 may provision back-end addresses that are transparent to the user. For example, web portal 240 may provision a user address to the user called user@organization.com and two back-end addresses called user@organization.HISP.org and protocol3762.org\user. Web portal 240 may also provision a single back-end address that is the same as the user address, or may provision multiple back-end addresses, one of which serves as the user address. Web portal 240 may provision one or more back-end addresses to enable users to send messages through a single user address according to multiple protocols, each of which may be associated with a back-end address.

Web portal 240 may interact with message receiver 250 and message sender 260 to allow users and organizations to send and receive messages to other organizations and their users. For example, web portal 240 may allow a doctor to send a patient file to another doctor who works at a neighboring hospital or to other users in the same organization. For example, web portal 240 may allow a nurse to send a message to the attending physician in the same hospital.

Web portal 240 may interact with a graphical user interface (GUI). Web portal 240 may provide a GUI directly, such as a web page at a URL, where the web page allows users and organizations to send and receive messages through document-exchange system 201. Web portal 240 may also not provide a GUI directly, such as by interacting through a network with a GUI provided by another system like a standalone application on a user's system.

Web portal 240 may interact with a GUI according to a protocol, such as by interacting securely with the GUI according to a protocol like SSL/TTS. Web portal 240 may also secure communications as a result of a protocol that requires end to end encryption between the sender and recipient of messages exchanged according to the protocol.

Web portal 240 may interact with a GUI to allow users and organizations to send and receive messages through document-exchange system 201. An example of a GUI for a messaging application consistent with this invention is described in further detail with reference to FIG. 5 below.

Message receiver 250 and message sender 260 receive and send messages respectively. They may receive and send messages according to a protocol. For example, message receiver 250 and message sender 260 may receive and send messages according to a secure protocol, such as the Direct standard or according to multiple protocols. For example, message receiver 250 and message sender 260 may receive and exchange messages with one user using one protocol and with another user using a different protocol.

The protocol message receiver 250 and message sender 260 use may have certain requirements, such as a certain level of encryption. For example, the protocol may mandate encryption using symmetric key encryption with a key of a particular length. The protocol may have other message requirements. For instance, the protocol may mandate a particular message syntax, message length, document structure, or other feature. The protocol may have requirements unrelated to the message itself. For example, the protocol may require registration of addresses in a central database authority and allow messaging only between registered addresses, or distribution of public keys with particular entities. The protocol may also only allow sending messages through predefined, approved intermediaries.

Message receiver 250 and message sender 260 may exchange messages with users or organizations. Message receiver 250 and message sender 260 may send and receive messages from/to users and/or organizations that are registered with document-exchange system 201. For example, message receiver 250 and message sender 260 may exchange messages with employees in a hospital that has registered with document-exchange system 201 and has been provisioned a sub-domain.

Message receiver 250 may also receive messages from users or organizations that have not registered with document-exchange system 201. For example, message receiver 250 may receive from a user not registered with document-exchange system 201 a message intended for a registered recipient. Message sender 260 may send messages from a registered user to another user that is unregistered. For example, a doctor employed by a registered organization may desire to send a message to another doctor employed by an unregistered organization.

Message sender 260 may send messages directly or indirectly. Message sender 260 sends messages directly to an address associated with the recipient, such as directly to the Direct address of a recipient that complies with the Direct standard. Message sender 260 may also send messages indirectly through an intermediary, such as to another document-exchange system or an HISP that forwards the message to the recipient or another intermediary.

Message receiver 250 and message sender 260 may interact with database 220. They may interact with public and private keys in database 220. In this way, they can implement symmetric-key or other encryption algorithms.

Message receiver 250 may receive messages through multiple protocols. For example, message receiver 250 may receive a message from doctor B of organization 2 according to one protocol and receive a message from nurse C of organization 3 according to a second protocol. Message receiver 250 can also receive messages according to different protocols using different back-end addresses for each protocol. For example, message receiver 250 may receive a first message using a first back-end address according to a first protocol and receive a second message using a second back-end address according to a second protocol.

Message sender 260 may send messages according to one or more protocols. For example, message sender 260 may send a message from doctor A of organization 1 to doctor B of organization 2 according to one protocol, and send a message to nurse C of organization 3 according to a second protocol. Message sender 260 may send messages according to different protocols using different back-end addresses for each protocol.

Figure 5:
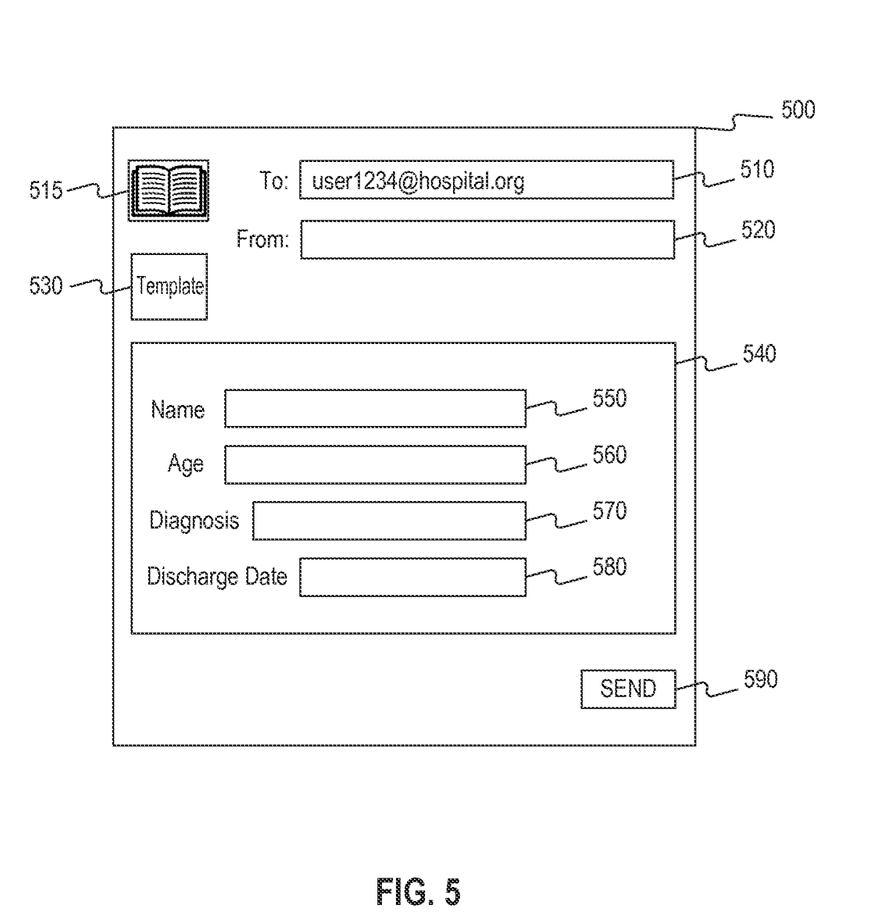
FIG. 5 illustrates an exemplary graphical user interface (GUI) for a document-exchange application consistent with this invention.

Message sender 260 may determine which back-end address to use based on the capabilities of the recipient. For example, message sender 260 may determine to use one protocol and back-end address to send a message to a particular recipient that cannot receive messages according to a different protocol. Message sender 260 may interact with web portal 240 to provide the sending user with an indication of the receiving capabilities of the user. Message sender 260 may interact with web portal 240 to provide the user with a list of protocols the recipient complies with, or may indicate to the sending user which users comply with which protocols. FIG. 5 below, shows this in more detail. Message sender 260 may also not provide an indication of the protocol used to the sender, which may be the case if the protocol used by message sender 260 were visible or transparent to the user, as described further below in reference to FIG. 5.

Figure 3:
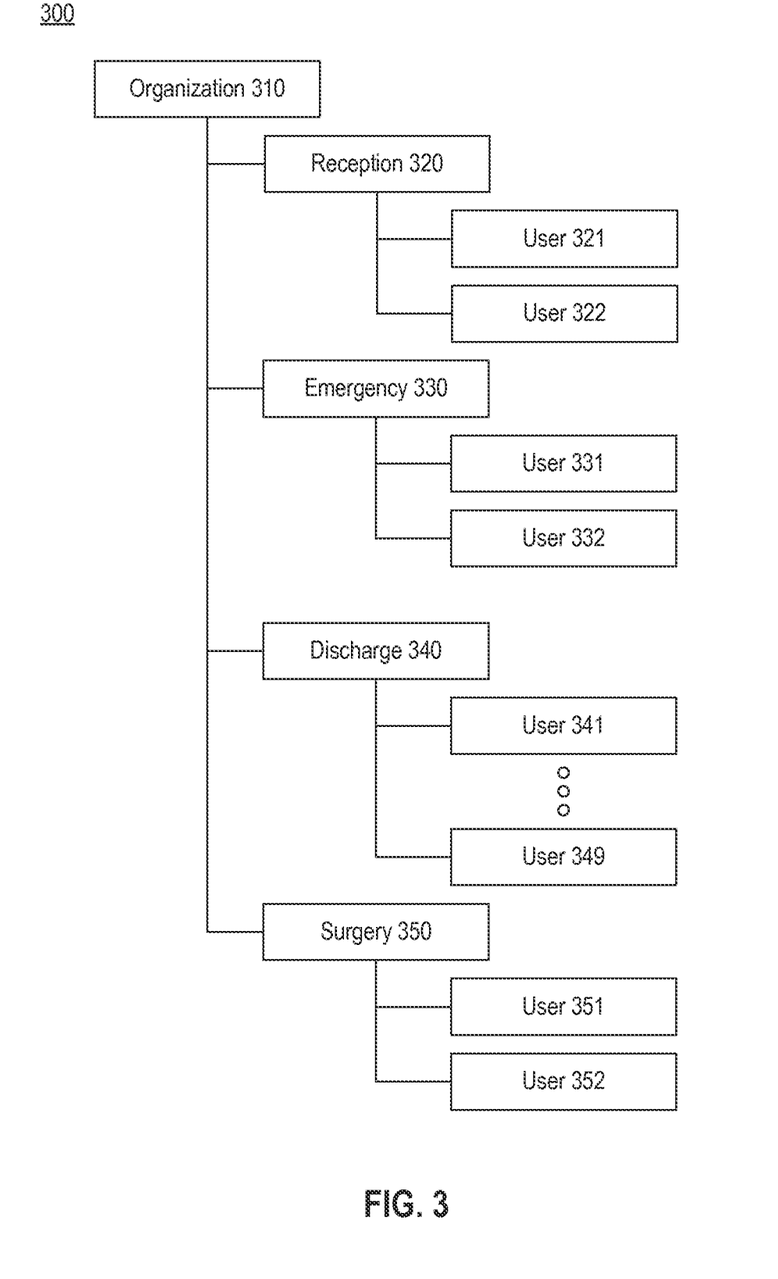
FIG. 3 illustrates an exemplary organizational structure consistent with embodiments of this invention.

FIG. 3 illustrates an exemplary organizational structure. Organizational structure 300 is provided by way of illustration and example only, and that this disclosure contemplates other organizational structures. For example, an organizational structure could be in the form of a multi-root tree or in list form. Organizational structure 300 may represent the structure of organization 310 in the form of a tree with nodes. Organization 310 may include nodes defining sub-groups. Organization 310 may also include departments. For example, organization 310 is a hospital and includes reception 320, emergency 330, discharge 340, and surgery 350.

Each department may include users (e.g., employees) that work in the department. Reception 320 includes users 321 and 322.

Organizational structure 300 may represent the employment relationships of employees in an organization. It may include user 331 in emergency department 330. Organizational structure 300 may also represent the physical location of employees in an organization, such as showing that user 321 physically sits at a reception area, represented here by node 320. Organizational structure 300 may also represent the location of individuals at different offices. Organizational structure 300 may be stored as a file or collection of files in database 220.

Organizational structure 300 may be provided by an organization. Organizational structure 300 may be provided by an organization through web portal 240. For example, web portal 240 may interact with a GUI to provide an interface for inputting a list of employees and departments for which the employees work. Organizational structure 300 can be provided by users through web portal 240. For example, web portal 240 may interact with a GUI to provide an interface for each user to input their location and department upon registration.

Organizational structure 300 may be used by users sending messages through document-exchange system 201. Users may use organizational structure 300 to select message recipients, such as to determine the appropriate user address. Users may also use organizational structure 300 to enhance their efficiency and optimize their workflow. For example, web portal 240 may use organizational structure 300 to select message templates automatically or select user addresses as described further below in reference to FIG. 5. Organizational structure 300 may be displayed to users using any suitable GUI, such as a list with tags or as collapsible tree structure.

Figure 4:
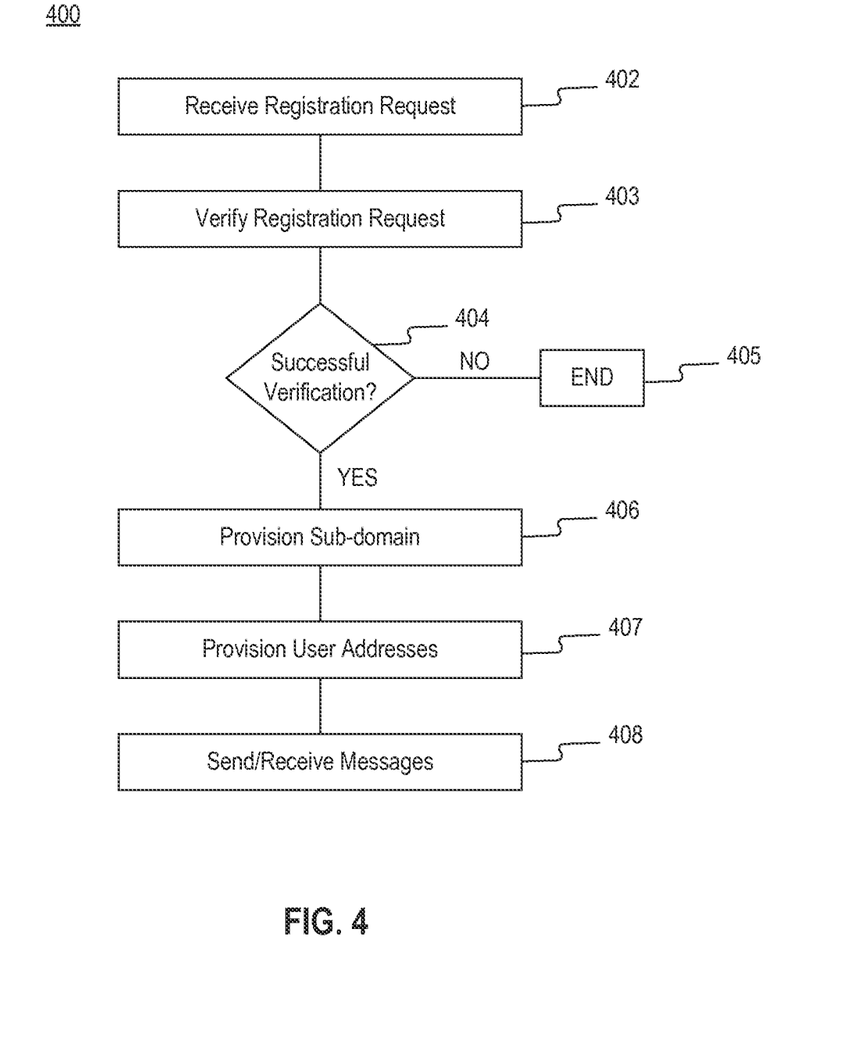
FIG. 4 illustrates a flowchart of an exemplary messaging process consistent with this invention.

FIG. 4 illustrates a flowchart of an exemplary messaging process, consistent with this invention. Process 400 may be implemented with one or more of the components in FIG. 2, but other arrangements and implementations are possible. Process 400 may be implemented with one or more processors. The order of the steps in FIG. 4 is merely exemplary.

In step 402, request receiver 210 receives a registration request that may come from an organization. The registration request may indicate a desire of the organization to access document-exchange system 201. Request receiver 210 may access data stored in database 220. Request receiver 210 may also update data in database 220 and forward information with the registration request to verifier 230.

In step 403, verifier 230 verifies the registration request, such as according to requirements of a protocol. Verifier 230 may examine and update data stored in database 220.

In step 404, document-exchange system 201 determines whether verifier 230 successfully verified the registration request. If not, the process proceeds to step 405 and terminates. If verifier 230 successfully verified the registration request, the process proceeds to step 406.

In step 406, web portal 240 may provision an organizational sub-domain. Web portal 240 may update database 220 to reflect the provisioned organizational sub-domain. Web portal 240 may interact with a GUI to allow an organization's representative to interact with the sub-domain to input an authorized user list.

In step 407, web portal 240 may provision user addresses, such as in response to registration requests from users. Web portal 240 may also forward information in a user registration request to verifier 230. Web portal 240 may interact with database 220 to store and retrieve data in connection with provisioning user addresses. Web portal 240 may also provision user addresses as a result of an organization's representative adding users to an authorized user list.

In step 408, message receiver 250 and message sender 260 receive and send messages from and to the provisioned user address. Message receiver 250 and message sender 260 may receive and send messages from and to the user address through back-end addresses, and may interact with a GUI, to allow users to receive and send messages from and to the provisioned user address. Message receiver 250 and message sender 260 may receive and send messages that comply with one or more protocols, to achieve interoperable messaging.

FIG. 5 illustrates an exemplary GUI for a document-exchange application consistent with the invention. Document-exchange application 500 may include recipient field 510, from field 520, address book 515, template selector 530, message area 540, and send button 590. The number and arrangement of components and features in FIG. 5 may vary and are provided by way of illustration only. A different GUI may be appropriate for a document-exchange application provided through a website interface than through a standalone or dedicated application. Different GUIs may also be appropriate for different platforms, such as a phone, tablet, or PC.

Document-exchange application 500 may interact with web portal 240 as described above with reference to FIG. 2, such as to allow users to send and receive messages through document-exchange system 201. Document-exchange application 500 and web portal 240 can exchange data, such as through web portal 240. For example, document-exchange application 500 may receive a recipient list from web portal 240 in database 220, as described below in reference to address book 515. Communications between document-exchange application 500 and web portal 240 may follow a protocol, such as one that requires secured communications through SSL/TTS.

Document-exchange application 500 may send messages in message area 540 from the user to web portal 240. Web portal 240 may then send the message to the recipient through message sender 260 according to a protocol. Document-exchange application 500 may also receive messages from web portal 240. Document-exchange application 500 may receive messages from web portal 240 and display them in message area 540.

Recipient field 510 may allow a user to specify recipients for a particular message. Recipient field 520 may allow a user to specify multiple recipient addresses separated by a delimiter, or recipient field 520 may reflect recipient addresses the user selected from a list, as described below in reference to address book 515.

Recipient field 510 may interact with address book 515, such as allow a user to select from a list of recipients. Address book 515 may automatically fill out recipient field 510 on behalf of the user. A user might only be permitted to enter recipients into recipient field 510 using address book 515.

Address book 515 may contain a list of recipients, which may include those in the same organization as the user. For example, address book 515 may contain a list of employees at the hospital at which a doctor works, and the list may include employees provided by the hospital representative after document-exchange system 201 provisioned a sub-domain to the hospital. The list may include those in the hospital that have been provisioned user addresses. Address book 515 may also provide a list of recipients with all users and organizations that have registered with document-exchange system 201. For example, the list may include a state-wide or nation-wide list of users that have registered with document-exchange system 201.

Address book 515 may allow users to search for recipient addresses, or to select the organization to which the recipient belongs to and only show addresses from that organization using data, such as organizational structure 300. Address book 515 may allow users to filter addresses by category in an organization, such as by department or occupation, and may allow users to search or filter for recipients based on additional or alternate criteria. Address book 515 may also allow users to show all users or organizations that comply with a particular protocol or show all protocols a particular user or organization complies with.

Address book 515 may provide an interface to allow a user to filter or sort potential recipients, for example based on proximity, geography, location in an organizational structure, protocols, addresses, security strength, or date. For example, address book 515 may provide an interface to allow users to search for user addresses in a five-mile radius, or may allow users to select from other users or organizations in an umbrella organization or association, such as a HISP, HIE, or hospital chain. Address book 515 may also allow users to filter the list of potential recipients to show only those that comply with a certain protocol, such as the Direct standard. Address book 515 may allow users to filter the list of potential recipients based on a region or presence in a Health Service Area (HSA) or Health Referral Region (HRR). Address book 515 may also display a list that includes indicators for categories, or a list of all addresses and with colored tags to indicate the protocols each address complies with. Address book 515 may also display a list of addresses and highlight those that are part of the document-exchange system.

Address book 515 may also include recipients not registered with document-exchange system 201, or previously used recipients. Also, address book 515 may provide a list of recipients registered with another document-exchange system, which may occur if the provider of document-exchange system 201 partners with a another document-exchange system provider and exchanges a list of user addresses. Document-exchange system 201 may then store the list of user addresses from the second document-exchange provider in database 220 and transmit that list to document-exchange application 500 to be displayed in address book 515.

Alternatively, address book 515 may provide a list of recipients from a third-party directory, such as those from an electronics health record (EHR) vendor, HISP provider directory, or a national database authority.

From field 520 may allow a user to specify a user address or one of many user addresses from which the user is authorized to send messages. A doctor at a hospital may be authorized to send messages through an individual doctor's user address as well as through another user or organizational address due to his role as a hospital administrator. From field 520 may also allow a user to specify back-end addresses to use. For example, from field 520 may include a button (not shown) that allows a user to select from a list of back-end addresses associated with a user address, where each of these back-end addresses may be associated with a particular protocol.

On the other hand, from field 520 may prevent the user from selecting from a list of back-end addresses. For example, from field may only allow the user to select a protocol according to which the message is to be sent. In such a case, from field 520 may not allow the user to select the back-end address and handles the selection transparently.

Field 520 may provide a button (not shown) that allows a user to select from a list of protocols, such as a list of protocols for which the user has back-end addresses. Field 520 may allow a user to select form a list of protocols with which the user's address complies. The list of protocols provided by from field 520 may depend on one or more factors, such as the desired recipient, the location of the recipient, the recipient's protocol capabilities, or the location of the user/sender. The list of protocols in from field 520 may also depend on a region, or may depend on the HSA or HRR where the user or organization is located.

Message area 540 allows the user to enter information to be sent in a message. Message area 540 could be a blank space into which a user may enter textual information to be sent as a message. Message area 540 may be a text box incorporating word-processing features (such as highlighting, fonts, styles, tables, etc.) that assist the user in composing a document or a blank space where a user may enter non-textual information, such as pictures, video, multimedia files, or document images.

Message area 540 may include message fields 550, 560, 570, and 580 in FIG. 5. As used in this disclosure, a "message field" refers to predefined content, such as predefined text information or graphical information like a textual or graphical header indicating the date or source of the message. In FIG. 5, message field 550 includes the text "Name:" as predefined text information.

A message field may also include user input fields, which are user-interface elements that allow users to enter information. For example, message field 550 includes a user-input field in the form of a text box that allows the user to enter a name associated with the message. User-input fields may allow users to enter a variety of information, such as textual information if the user input field is a text box or text area with word processing features. User input fields may also allow users to enter non-textual information, such as pictures, videos, document images, sound files, other multimedia files, x-rays, or 3D scans like a CAT scan.

If message area 540 does not include message fields, it can allow a user to compose a message from scratch. Message area 540 may include default message fields that might correspond to an organization, such as an organization header, or to an organization's policy. The message fields may be stored in database 220. Document-exchange application 500 may communicate with document-exchange system 201 and database 220 to determine which message fields to include in area 540.

Template selector 530 may allow users to select a message template. It could be a button. In FIG. 5, template selector 530 is a button that displays a list or other representation of available message templates.

A message template may be a predefined message with predefined fields. Message area 540 includes a message template with message fields 550, 560, 570, and 580. Message templates may contain message fields specific to business processes or workflows. These templates might correspond to workflows common in a hospital setting, such as requesting a record, ordering of a test, submitting documents for an audit, sending records to a patient portal, or referring a patient to another provider for care. Message templates may include message fields appropriate for the particular template. For example, a message template for requesting a record may include fields for the type of record, record identification number, patient name, request-by date, and/or other information relevant to a record request. A message template for a patient referral may include message fields for the patient name, the referring organization's name, a date, or other fields appropriate for a patient referral.

A message template may include both mandatory and optional fields. For example, a message template corresponding to a reply to a records request may include a mandatory text field for the patient name and a mandatory document attachment field for the patient record. The message template may also include an optional text field for organization or physician notes.

Database 220 may store message templates and communicate them to document-exchange application 500 through web portal 240. Database 220 may also store all of the message templates available to a particular organization based on that organization's subscription to document-exchange system 201, and communicate those templates to document-exchange application 500 for selection by template selector 530. Database 220 may also store the message templates the provider of document-exchange system 201 defines.

Database 220 may also store message templates a particular protocol defines. For example, a national standards-setting organization or government may mandate a particular format or syntax, or require certain information in a particular message type. The government may mandate that every records request include a social-security number, so the message templates for record requests may include a mandatory message field for a social-security number.

Document-exchange system 201 may also allow organizations to define their own custom message templates. For example, web portal 240 may provide an interface for an organization representative to define message templates to store in database 220.

Template selector 530 may select a message template based on the specific business process or workflow of the user. The selection can be manual from a list of templates, and template selector 530 may even help a user select the message template by providing a list of frequently-used templates.

Template selector 530 may select message templates automatically, for example, based on the type of message received. For example, template selector 530 may automatically select a patient-record template when replying to a patient records-request message. Template selector 530 may also automatically select the message template based on the user or location of the user in the organization. For example, template selector 530 may select the message template for patient referrals for a user in the referral department or when document-exchange application 500 is running from a device in the referral department. Such information may be obtained from database 220, which may store organization structure 300, or may automatically select the template corresponding to CAT scans when document-exchange application 500 is running on a device near the CAT scan machine. Template selector 530 may also help a user select a template or automatically select a template in other ways, such as past template selections or recently viewed messages.

Template selector 530 may also pre-fill one or more of the message fields based, for example, on the message replied to. For example, as a result of replying to a records request message for patient "Cindy Doe," template selector 530 may select the message template for patient records and pre-fill the message field corresponding to the patient name with "Cindy Doe."

Template selector 530 may also pre-fill message fields based on a business specific workflow, for example, one that sends a patient record after a patient referral. In this example, template selector 530 may automatically select a message template for sending a patient record after the document-exchange application sends a patient referral message, and may pre-fill message fields common to the patient-record and patient-referral templates.

Template selector 530 may also pre-fill user input fields. For example, template selector 530 may pre-fill a user input field corresponding to the patient's name, based on a received message being replied to with "Ben Doe." The user may then edit the name, for example, to "Benjamin Doe." Template selector 530 may also pre-fill message fields that do not allow user edits.

Figure 6:
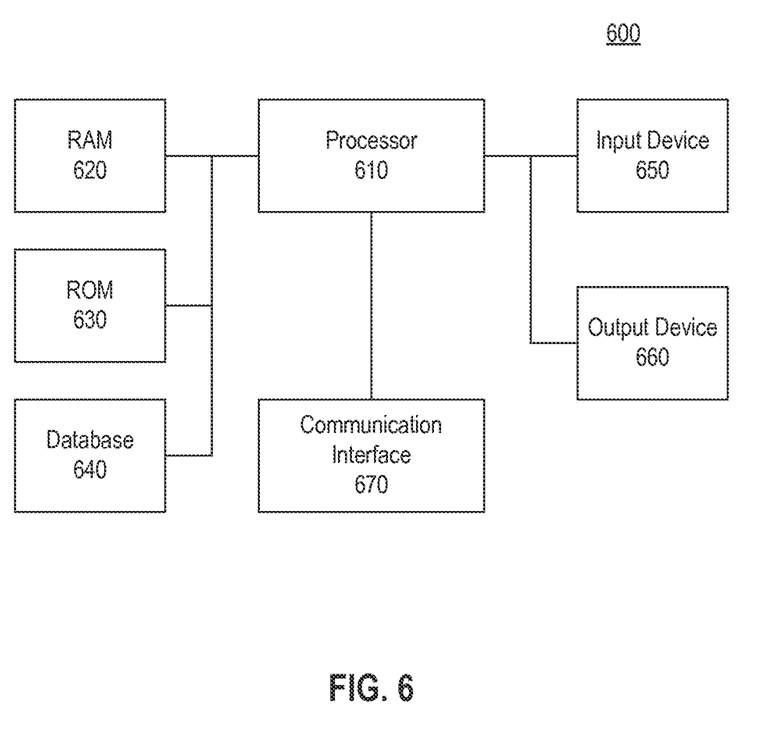
FIG. 6 illustrates an exemplary system for implementing this invention.

FIG. 6 illustrates an exemplary system for implementing embodiments consistent with this invention. As shown in FIG. 6, exemplary system 600 may include a processor 610 (also referred to as an electronic processor, central processing unit, or CPU) for managing and processing data, and performing operations consistent with this disclosure. Processor 610 may actually be one or more processors. System 600 may even be a special-purpose machine designed and configured to implement some or all of the components in FIG. 2. System 600 also includes RAM 620, ROM 630, and database 640. Database 640 may comprise optical, magnetic, signal, and/or any other type of storage device. System 600 may also include communication interface 670 that may comprise a network adaptor and may allow system 600 to connect to electronic networks, such as the Internet, a local area network, a wide area network, a cellular network, a wireless network, or any other type of network.

System 600 may include input device 650, which receives input from users or devices, such as keyboards, mice, trackballs, trackpads, eye-tracking devices, scanners, input or touch-sensitive screens, and cameras. System 600 also includes output device 660, which transmits data to users or devices, such as computer monitors, televisions, screens, projectors, printers, and plotters.

System 600 may implement some or all of the components in FIG. 2, such as features of document-exchange system 201 and some or all of the features in FIG. 5. For example, system 600 may execute instructions to display the GUI of document-exchange application 500 on output device 660, and receive user input through input device 650.

Other embodiments of the invention will be apparent to those skilled in the art from consideration of the specification and practice of the invention disclosed herein. The specification and examples are only exemplary, with the true scope and spirit of the invention being indicated by the following claims.

What is claimed is:

1. A method for exchanging data, the method comprising the following operations performed by a processor:
   receiving a request from an organization;
   provisioning an organizational sub-domain;
   selecting a protocol based on a location of a first user in the organization;
   verifying the request according to requirements of the protocol;
   provisioning a first user address to the first user, wherein the first user address is part of the organizational sub-domain;
   encrypting a message from the first user address; and
   sending the message from the first user address to a second user address according to the protocol.

2. The method of claim 1, further comprising:
   using an encryption message requirement of at least one of symmetric key encryption with a key length, a message syntax, a message length, or a document structure to encrypt the message from the first user address.

3. The method of claim 1, further comprising verifying an identity of the first user.

4. The method of claim 1, further comprising providing a list of protocols for sending the message.

5. The method of claim 4, wherein the protocols in the list of protocols reflect at least one of:
a location of the organization;
a region;
the location of the first user; and
a location of the second user.

6. The method of claim 1, further comprising:
determining a type of transaction associated with the message;
formatting the message based on the type of transaction;
providing a message field to the first user based on the type of transaction;
selecting the protocol for sending the message based on the type of transaction; and
sending the message using the protocol.

7. The method of claim 6, further comprising:
filling one or more message fields based on a second transaction associated with the message.

8. The method of claim 1, wherein encrypting the message includes asymmetric cryptography using a recipient's public key.

9. A system for exchanging data, the system comprising:
a storage device configured to store instructions;
a processor configured to execute the following instructions:
receive a request from an organization;
provision an organizational sub-domain;
select a first protocol based on a location of a first user in the organization;
verify the request according to requirements of the first protocol;
provision a first user address to the first user, wherein the first user address is part of the organizational sub-domain;
encrypt a message from the first user address; and
send the message from the first user address to a second user address according to the first protocol.

10. The system of claim 9, wherein the instructions are further configured to cause the processor to:
use an encryption message requirement of at least one of symmetric key encryption with a key length, a message syntax, a message length, or a document structure to encrypt the message from the first user address.

11. The system of claim 9, wherein the processor is further configured to execute an instruction to
provide a list of protocols for sending the message.

12. The system of claim 11, wherein the list of protocols reflects:
a location of the organization;
a region;
the location of the first user; or
a location of the second user.

13. The system of claim 9, wherein the processor is further configured to execute instructions to:
determine a type of transaction associated with the message;
format the message based on the type of transaction;
provide one or more message fields to the first user based on the type of transaction, the message fields comprising required fields and/or optional fields;
select the first protocol for sending the message based on the type of transaction; and
send the message using the first protocol after the required fields are filled out.

14. The system of claim 13, wherein processor is further configured to execute an instruction to:
pre-fill one or more of the message fields based on a second transaction associated with the message.

15. The system of claim 9, wherein the instruction to encrypt the message includes asymmetric cryptography using a recipient's public key.

16. A non-transitory computer-readable medium storing instructions, the instructions configured to cause a processor to perform operations comprising:
receiving a request from an organization;
provisioning an organizational sub-domain;
selecting a first protocol based on a location of a first user in the organization;
verifying the request according to requirements of the first protocol;
provisioning a first user address to the first user, wherein the first user address is part of the organizational sub-domain;
encrypting a message from the first user address; and
sending the message from the first user address to a second user address according to the first protocol.

17. The non-transitory computer-readable medium of claim 16, wherein the instructions are further configured to cause the processor to perform operations further comprising:
using an encryption message requirement of at least one of symmetric key encryption with a key length, a message syntax, a message length, or a document structure to encrypt the message from the first user address.

18. The non-transitory computer-readable medium of claim 17, wherein the instructions are configured to cause the processor to provide a list of protocols for sending the message.

19. The non-transitory computer-readable medium of claim 18, wherein the list of protocols reflects:
a location of the organization;
a region;
the location of the first user; or
a location of the second user.

20. The non-transitory computer-readable medium of claim 17, wherein the instructions are further configured to cause the processor to:
determine a type of transaction associated with the message;
format the message based on the type of transaction;
provide a message field to the first user based on the type of transaction;
select the first protocol for sending the message based on the type of transaction; and
send the message using the first protocol after one or more required fields are filled.

21. The non-transitory computer-readable medium of claim 20, wherein the instructions are configured to cause the processor to pre-fill one or more message fields based on a second transaction associated with the message.

22. The non-transitory computer readable medium of claim 17, wherein encrypting the message includes asymmetric cryptography using a recipient's public key.

* * * * *